(12) United States Patent
Morimoto

(10) Patent No.: US 6,347,279 B1
(45) Date of Patent: Feb. 12, 2002

(54) CAR NAVIGATION SYSTEM

(75) Inventor: Akihiro Morimoto, Kanagawa (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 0 days.

(21) Appl. No.: 09/585,036

(22) Filed: Jun. 1, 2000

(30) Foreign Application Priority Data

Jun. 2, 1999 (JP) .......................................... 11-155306

(51) Int. Cl.[7] .............................................. G01C 21/00
(52) U.S. Cl. ...................... 701/208; 701/25; 701/200; 701/212; 340/988; 340/990; 340/995
(58) Field of Search ................................. 701/200, 201, 701/208, 211, 212, 23, 25; 340/988, 990, 995

(56) References Cited

U.S. PATENT DOCUMENTS 5,793,310 A    8/1998   Watanabe et al. ............ 340/995
5,825,306 A *  10/1998  Hiyokawa et al. ........... 340/988
5,917,436 A *  6/1999   Endo et al. .................. 340/995

FOREIGN PATENT DOCUMENTS

| EP | 0 738 876 A2 | 10/1996 |
| JP | 07 160 845 | 6/1995 |
| JP | 08021739 | 1/1996 |
| JP | 09 230 785 | 9/1997 |

OTHER PUBLICATIONS

European Search Report, Application No. 00111648, dated Sep. 20, 2000.

* cited by examiner

Primary Examiner—Yonel Beaulieu
(74) Attorney, Agent, or Firm—Ratner & Prestia, PC

(57) ABSTRACT

A car navigation system displays texts free from overlapping with each other. The system includes a position calculator, a remote-control-unit, a map-memory for storing a map in a unit, an overlap determiner for determining whether or not a text undergone a co-ordinates-conversion is overlapped, a text-memory for storing a text in one unit, a displayed-data-memory for storing displayed text, and a display device for displaying a map.

16 Claims, 13 Drawing Sheets

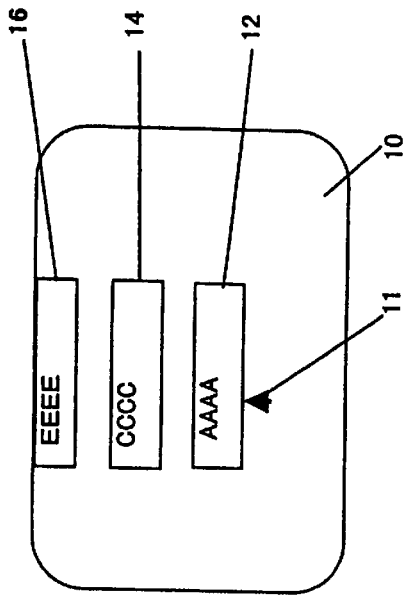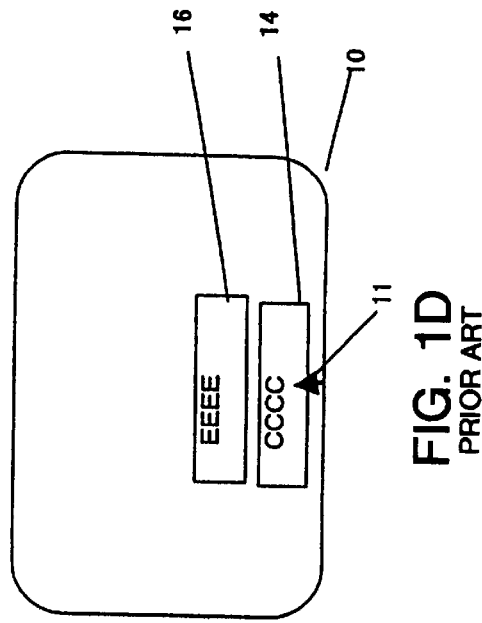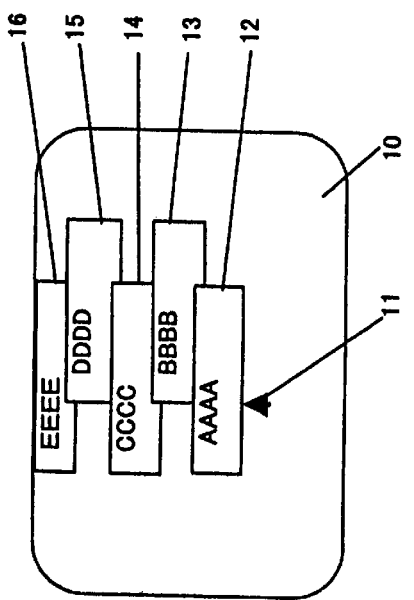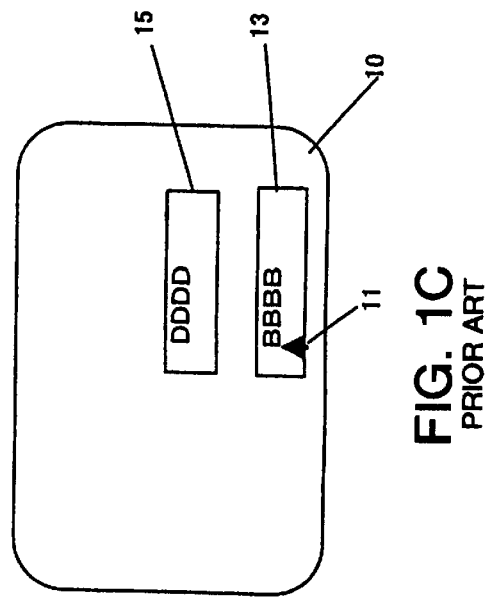

CAR NAVIGATION SYSTEM

FIELD OF THE INVENTION

The present invention relates to a car navigation system for displaying the present location and a heading direction of a car on a map displayed on a screen formed by a cathode ray tube or the like.

BACKGROUND OF THE INVENTION

A car navigation system displays a map on a display, and points at the car's position and a heading direction on the map. The map shows placenames and buildings with text or marks in addition to terrain and roads.

When items described with text or marks are closely located, the text and marks sometimes overlap each other. A prior art map has only shown the text closest to the car when such an overlap occurs.

FIGS. 1(A)–1(D) illustrate an example of the prior art map. In FIG. 1(A), a map (not shown) is displayed on screen 10, and a car position 11, place or point-of-interest names and buildings denoted with text 12, 13, 14, 15 and 16 are shown on the map. An arrow mark at car position 11 indicates that the car is heading upward. In FIG. 1(A), the heading direction is upward with respect to the paper.

In this case, a plurality of text such as 12, 13, 14, 15 and 16 are displayed and some of them overlap each other. This makes the map hard-to-read. Therefore, text 13 is deleted from the overlapping texts of text 12 and text 13, because text 13 is further away from car position 11, and text 15 is deleted from overlapping texts of text 14 and text 15, because text 15 is further away from car position 11. A resultant map thus drawn is shown in FIG. 1(B).

However, when the car moves, the text displayed varies accordingly, such as from FIG. 1(B), to FIG. 1(D) through FIG. FIG. 1(C), and the varied text thus blinks. This makes the screen hard-to-read.

SUMMARY OF THE INVENTION

The present invention addresses the problem discussed above, and aims to provide a car navigation system providing an easy-to-read display by avoiding a map hard-to-read due to a plurality of text, and free from text blinking.

The car navigation system of the present invention is defined in the appended claims and comprises the following elements:

a text memory for storing text data included in a map; and a displayed data memory for storing displayed data.

This car navigation system determines an overlap of the text stored in the text memory with the displayed data stored in the displayed-data-memory, and displays a text free from overlap.

BRIEF DESCRIPTION OF THE DRAWINGS

FIGS. 1(A)–1(D) illustrate a screen showing a content displayed of a conventional car navigation system.

DESCRIPTION OF THE PREFERRED EMBODIMENT

Exemplary embodiments of the present invention are demonstrated hereinafter with reference to the accompanying drawings.

First Exemplary Embodiment

Figure 2:
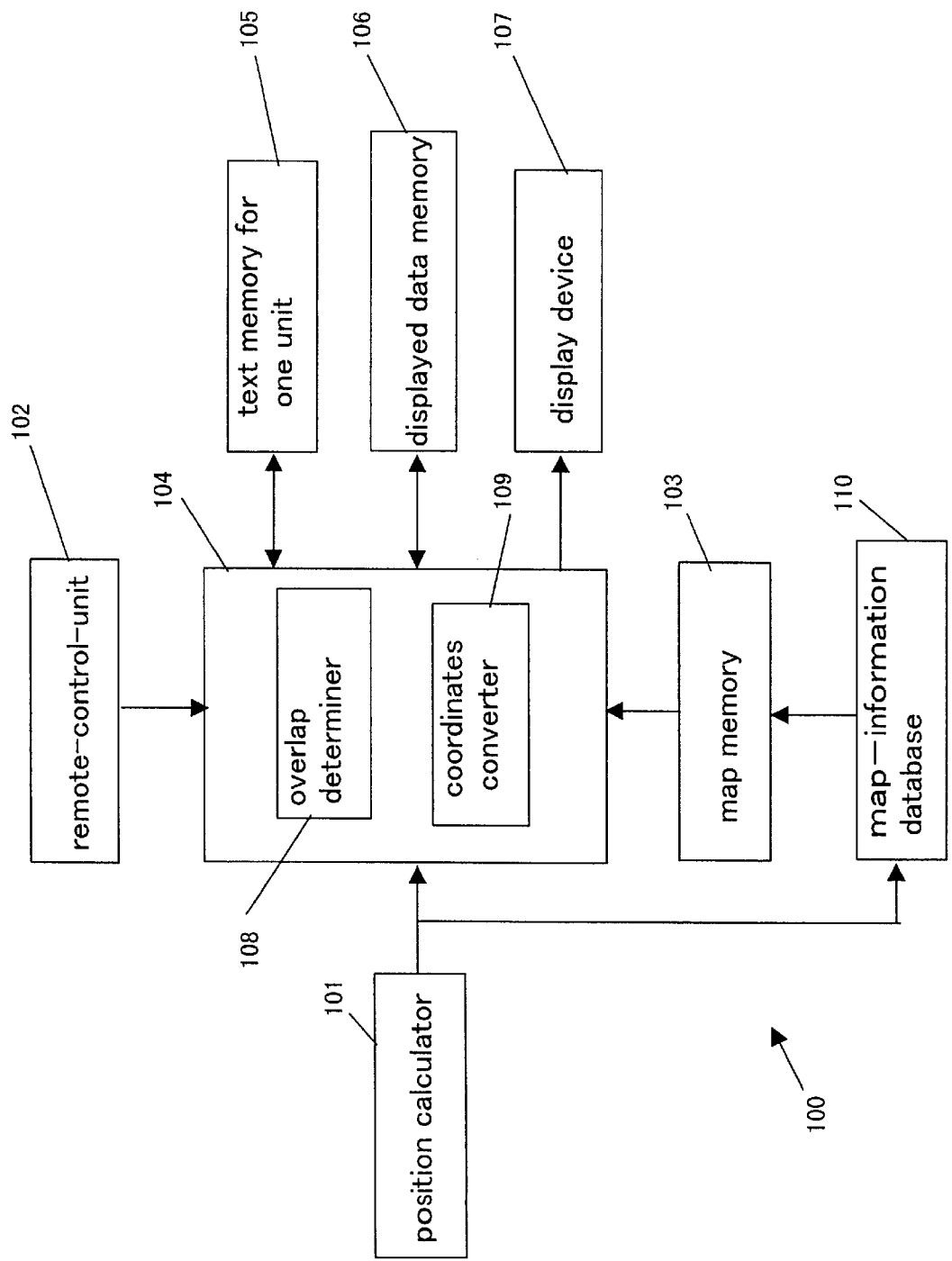
FIG. 2 is a block diagram illustrating a structure of a car navigation system in accordance with a first exemplary embodiment of the present invention.

In FIG. 2, car navigation system 100 includes a position calculator 101, such as a global-positioning-system (GPS) receiver, for determining or figuring out the present position of the car. Map-information database 110 includes surroundings of the present position figured out by position calculator 101, and is read out unit by unit. Database 110 is stored in a map-memory 103. Co-ordinates converter 109 converts the co-ordinates of the map-information units stored in memory 103 to other co-ordinates to be displayed on a display device 107.

Text memory 105 stores one unit of text existing in the map information whose co-ordinates are converted by converter 109. Displayed data memory 106 stores the map information already displayed on display device 107. This map information includes terrain, roads and information identifying text, e.g. co-ordinates of the text, latitude and longitude, as well as attributes such as colour and size. Overlap determiner 108 determines an overlap of the text stored in text memory 105 with another text stored in displayed-data memory 106, and displays specified text on display device 107 based on the resultant determination. Overlap determiner 108 and co-ordinates converter 109 are incorporated in a controller 104 which may be operable through a remote-control-unit 102. The driver of the car or a person sharing the car operates control-unit 102 thereby manipulating the car-navigation-system 100.

Figure 3:
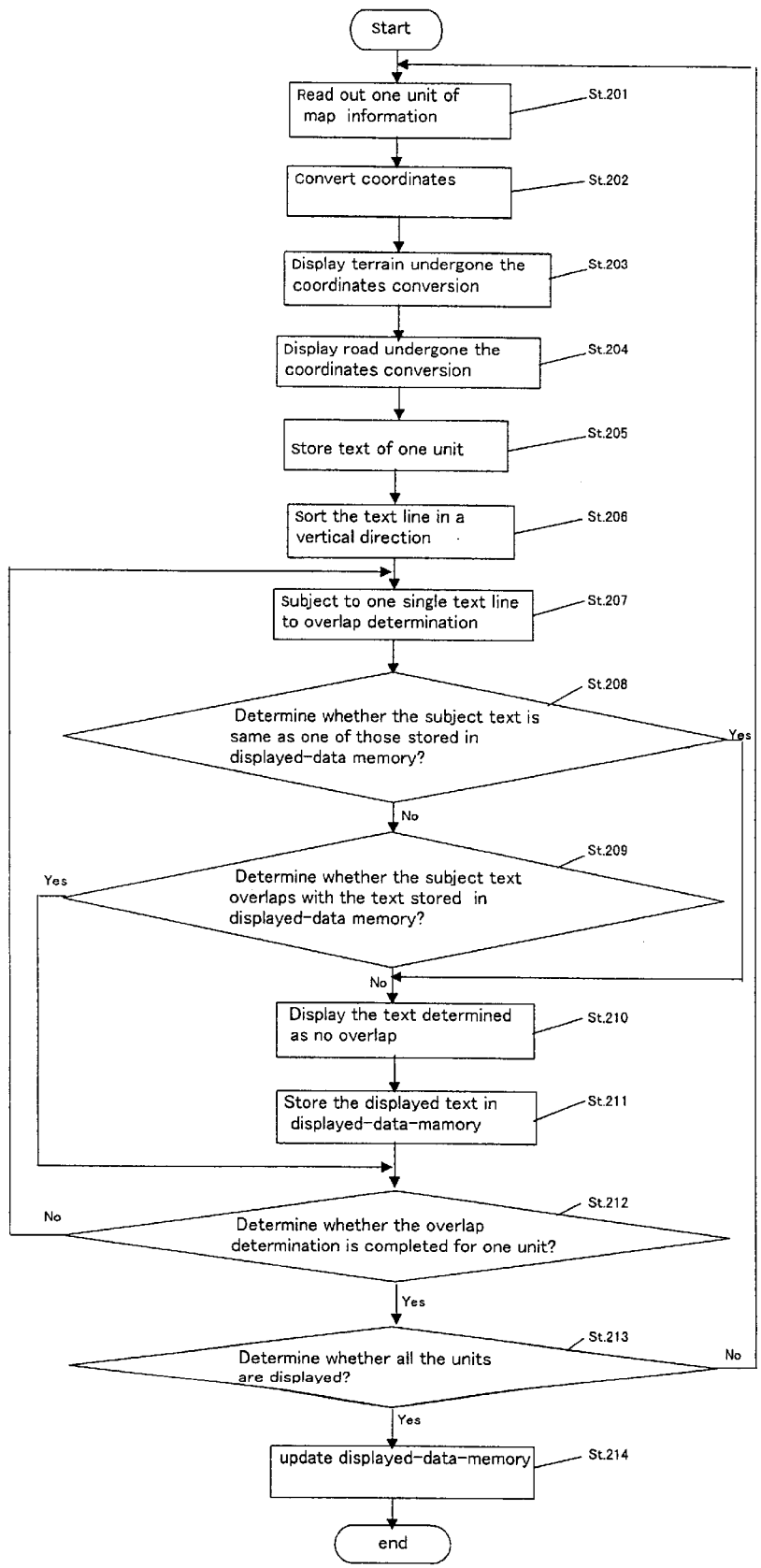
FIG. 3 is a flowchart depicting an operation of the car navigation system used in the first embodiment.

The operation of car-navigation-system 100 is demonstrated hereinafter with reference to FIG. 3. In the following description, a lower section of a screen is displayed advantageously over other sections. First, in step 201, one unit of map information—corresponding to the present car position calculated by position calculator 101—is read out from map-information database 110, then the one unit information is stored in map memory 103. One unit of map information, in general, includes terrain, roads and texts. In step 202, coordinates converter 109 converts the co-ordinates of those data stored in memory 103 into other co-ordinates to be displayed on the screen. In this embodiment, the co-ordinates are rotatively converted in accordance with the heading-up method, which displays a heading direction upwardly.

In step 203, the terrain undergone the co-ordinates conversion in step 202 is displayed, and in step 204, the roads undergone the conversion on step 202 is displayed, and the displayed terrain as well as road are stored additionally in text memory 105. In step 206, the text stored is sorted in a vertical direction. In step 207, one single text on the bottom line of the screen is subjected to the overlap determination because the lower section of the screen is advantageously displayed with respect to other sections.

In step 208, overlap determiner 108 determines whether or not the subject text is the same as one of those stored in displayed-data memory 106. When the text on the bottom line is not the same, forward to step 209. If the text is the same as the one stored in memory 106, jump to step 210 in order to display the text advantageously over other texts.

Figure 4:
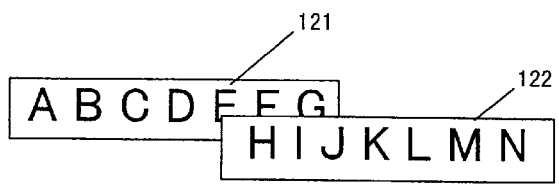
FIG. 4 and FIG. 5 illustrate an operation of determining an overlap of text in the car navigation system of the first embodiment.
Figure 5:
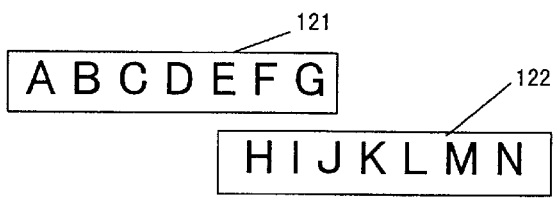

In step 209, overlap determiner 108 determines whether or not the subject text overlaps with the text sorted on step 206 and stored in displayed-data memory 106 (second step of overlap determination). In this step, determiner 108 determines whether or not frames such as rectangles 121 and 122 circumscribing the texts overlap each other even in parts, as shown in FIG. 4 and FIG. 5. FIG. 4 shows an example of an occurring overlap, and FIG. 5 shows an example without overlap.

Figure 6:
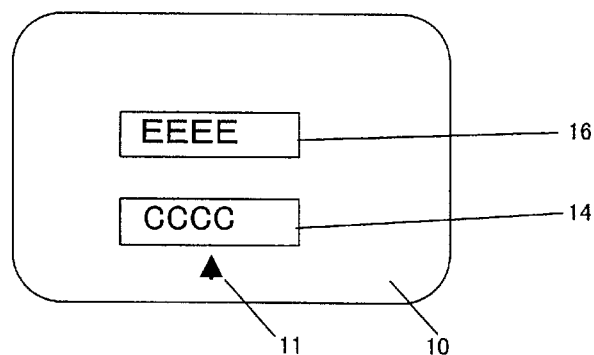
FIG. 6 and FIG. 7 illustrate a screen showing a content displayed of the car navigation system of the first embodiment.

When determiner 108 determines that an overlap exists in step 209, jump to step 212, and if determiner 108 determines that no overlap exists, then move on to step 210. In step 210, the text determined as having no overlap is displayed on display 107. As a result, display-device 107 displays only the text that has been determined as not overlapping with the text already displayed, and does not display the text which has been determined as overlapping. FIG. 6 shows an example of the screen displaying the text. When the car moves in this condition, car position 11 moves scrolling the screen, and texts 14 and 16 stay the same without blinking.

In step 211, the text displayed in step 210 is stored in displayed-data memory 106.

In step 212, it is determined whether or not the overlap-determination for all the text lines in one unit is completed. In the case of completion, move on to step 213, and if the determination is not completed, return to step 207 to repeat the same overlap-determination-process on the next text line. In step 213, it is determined whether or not all the units necessary for this displaying have been displayed. When all the units have been displayed, move on to step 214, and if not, return to step 201 to repeat the same process for the next text. In step 214, some information—not used for re-writing the screen this time—is deleted from the information stored in displayed-data-memory 106, so that memory 106 is updated for the next overlap determination.

Figure 7:
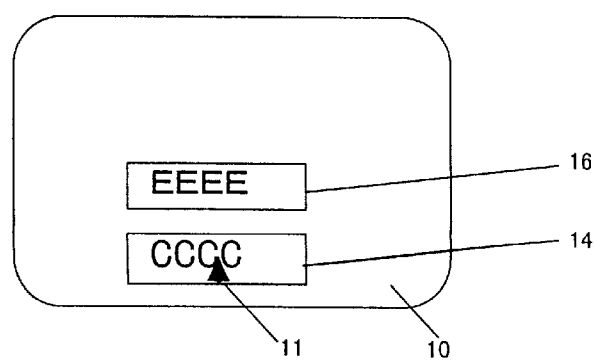

As discussed above, the car navigation system in accordance with the first embodiment proves that only the text that does not overlap the already-displayed-text is displayed and thus prevents the map on the screen from being hard-to-read due to a plurality of texts. This system also prevents the text being displayed from blinking when the car moves, although the moving of the car entails the displayed screen to vary as shown going from FIG. 1(B) to FIG. 6 and to FIG. 7.

In step 209, frames circumscribing the texts are used for the overlap determination; however, smaller or larger frames than these ones can be used.

However, instead of displaying a single text line one-by-one in step 210, it is also possible to display all text lines of one unit as a batched display after step 212.

Second Exemplary Embodiment

Figure 8:
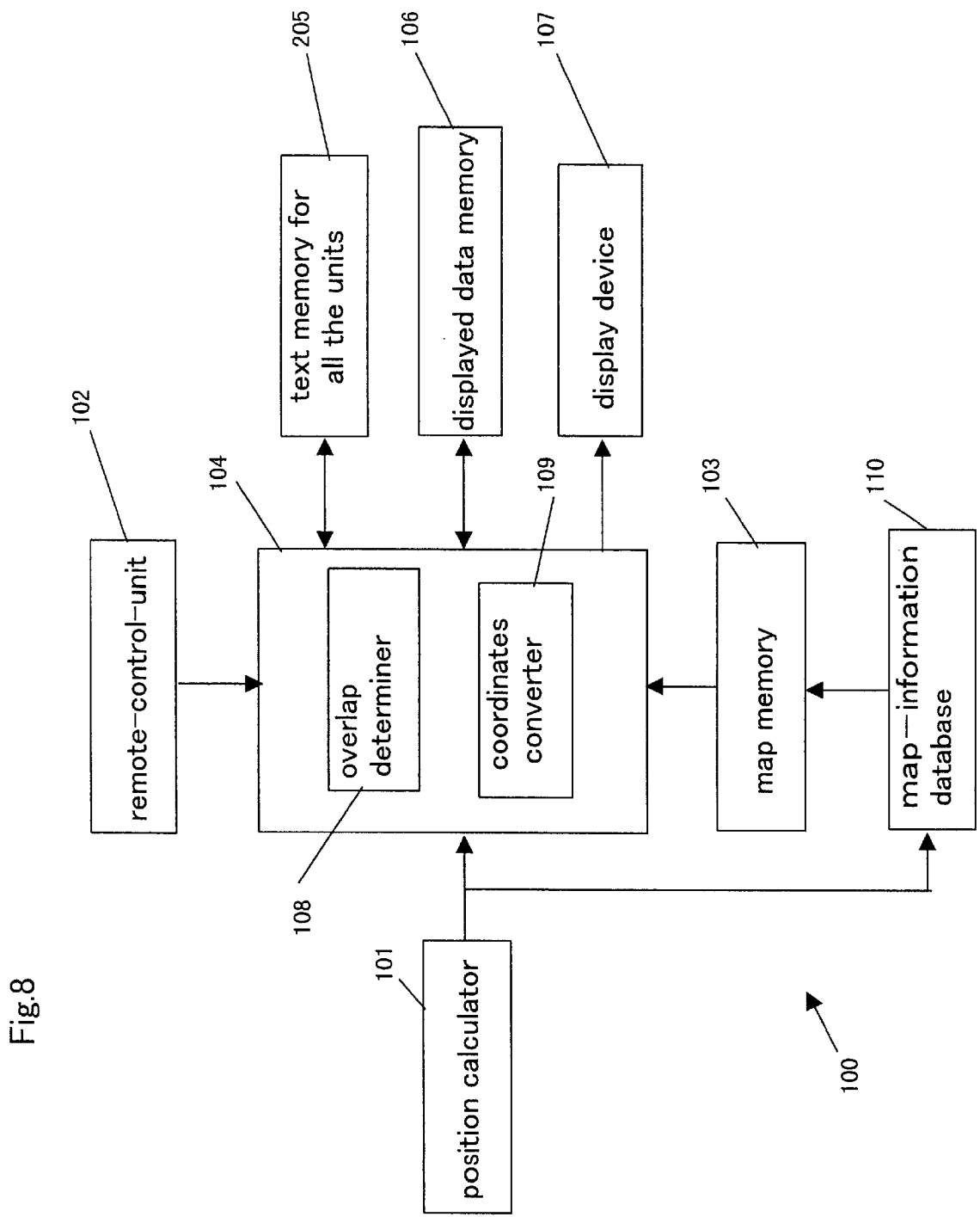
FIG. 8 is a block diagram illustrating a structure of a car navigation system in accordance with a second exemplary embodiment of the present invention.

FIG. 8 illustrates a structure of a car navigation system in accordance with a second exemplary embodiment. In FIG. 8, the same elements as shown in FIG. 2 are denoted with the same reference marks, and the descriptions thereof are thus omitted here. The structure of FIG. 8 differs from that of FIG. 2 in the storing method of text-memory 205, i.e. text memory 205 does not store one unit of texts, but stores all the units necessary for re-writing the screen.

Figure 9:
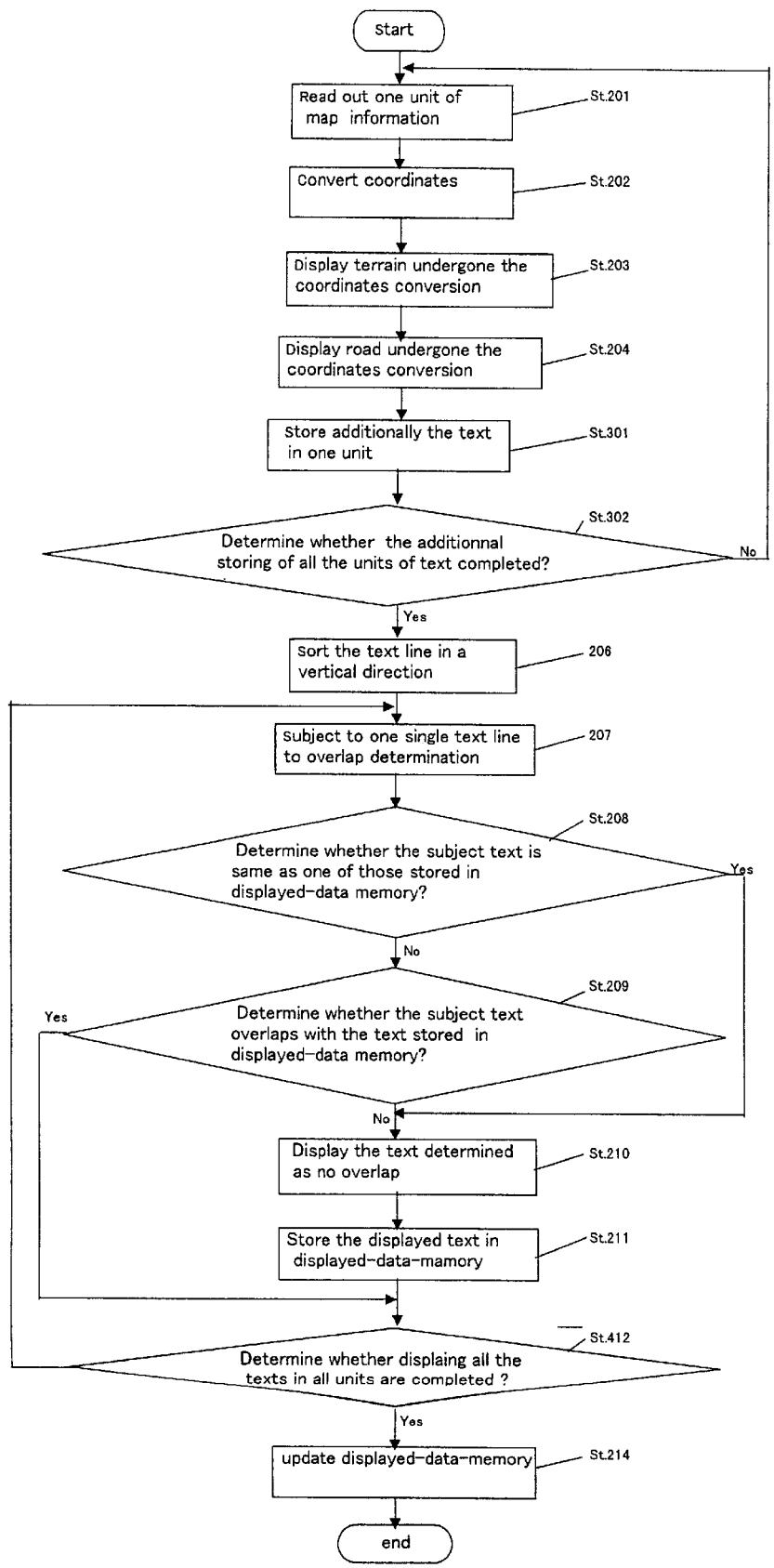
FIG. 9 is a flowchart depicting an operation of the car navigation system used in the second embodiment.

The operation of this car navigation system is demonstrated hereinafter with reference to the flowchart of FIG. 9. The same steps as in FIG. 3 are denoted with the same step numbers and the descriptions thereof are omitted here.

Step 301: Store additionally the text in one unit, which has undergone the co-ordinates-conversion at step 202 into text memory 205.

Step 302: Determine whether or not the additional storing of all the units of texts is completed. If it is completed, move on to step 206, and if not, return to step 201 to store the next unit and repeat the same process.

After step 206, the same processes as described in the first embodiment are taken, and in step 412 whether or not the completion of displaying all the texts in all units is determined. If it is not completed yet, return to step 207 and repeat the same process to the next text. If completed, move on to step 214, and delete some information—not used to screen re-writing this time—out of the information stored in displayed-data memory 106, so that memory 106 is updated for the next overlap-determination.

Further, similar to the first embodiment, the text in all units can be displayed in one go as a batch after step 412.

Third Exemplary Embodiment

Figure 10:
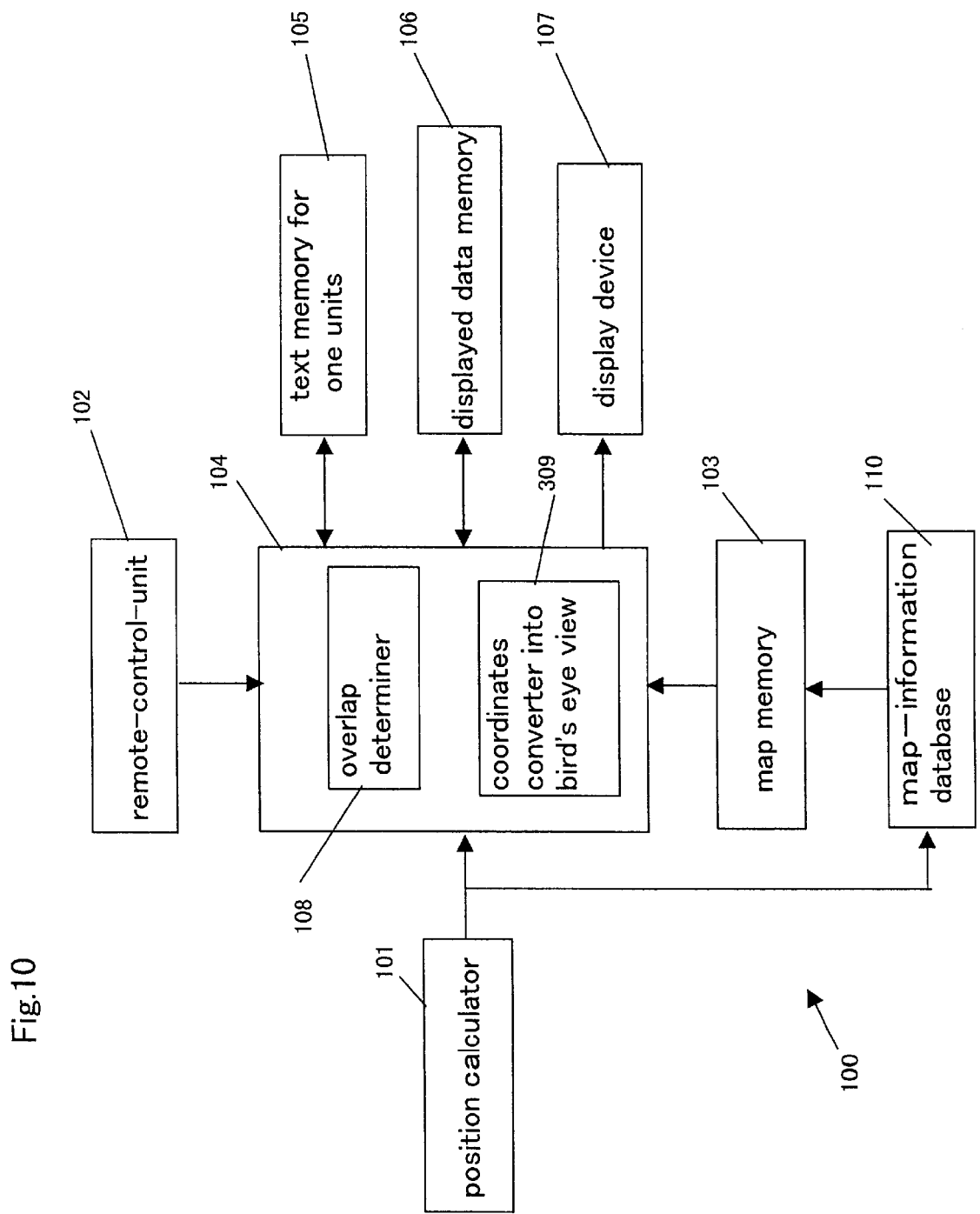
FIG. 10 is a flowchart depicting an operation of the car navigation system used in the third embodiment.

FIG. 10 illustrates a structure of a car navigation system in accordance with a third exemplary embodiment. In FIG. 10, the same elements as shown in FIG. 2 are denoted with the same reference marks, and the descriptions thereof are thus omitted here. The structure shown in FIG. 10 differs from that in FIG. 2 in the following two points: (1) co-ordinates converter 109 in FIG. 2 rotatively converts the co-ordinates of text; however, converter 309 in FIG. 10 converts the text into bird's eye view, i.e. a view in which objects which are further away are seen in the upper section of the view whereas objects nearby are seen in the lower section of the view, and (2) the size of a frame circumscribing the text is different, i.e. the bird's-eye-view-conversion makes an upper section of a screen more vulnerable to overlapping of texts than a lower section due to cluttering of information the upper section. Therefore, the frame size in the upper section should preferably be larger than the frame size in the lower section. Such a structure allows easier deletion of overlapping frames in the upper section of the screen, and fewer frames are deleted in the lower section. As a result, fewer frames are displayed in the upper section of the screen as compared to the lower section thus improving readability.

Fourth Exemplary Embodiment

Figure 11:
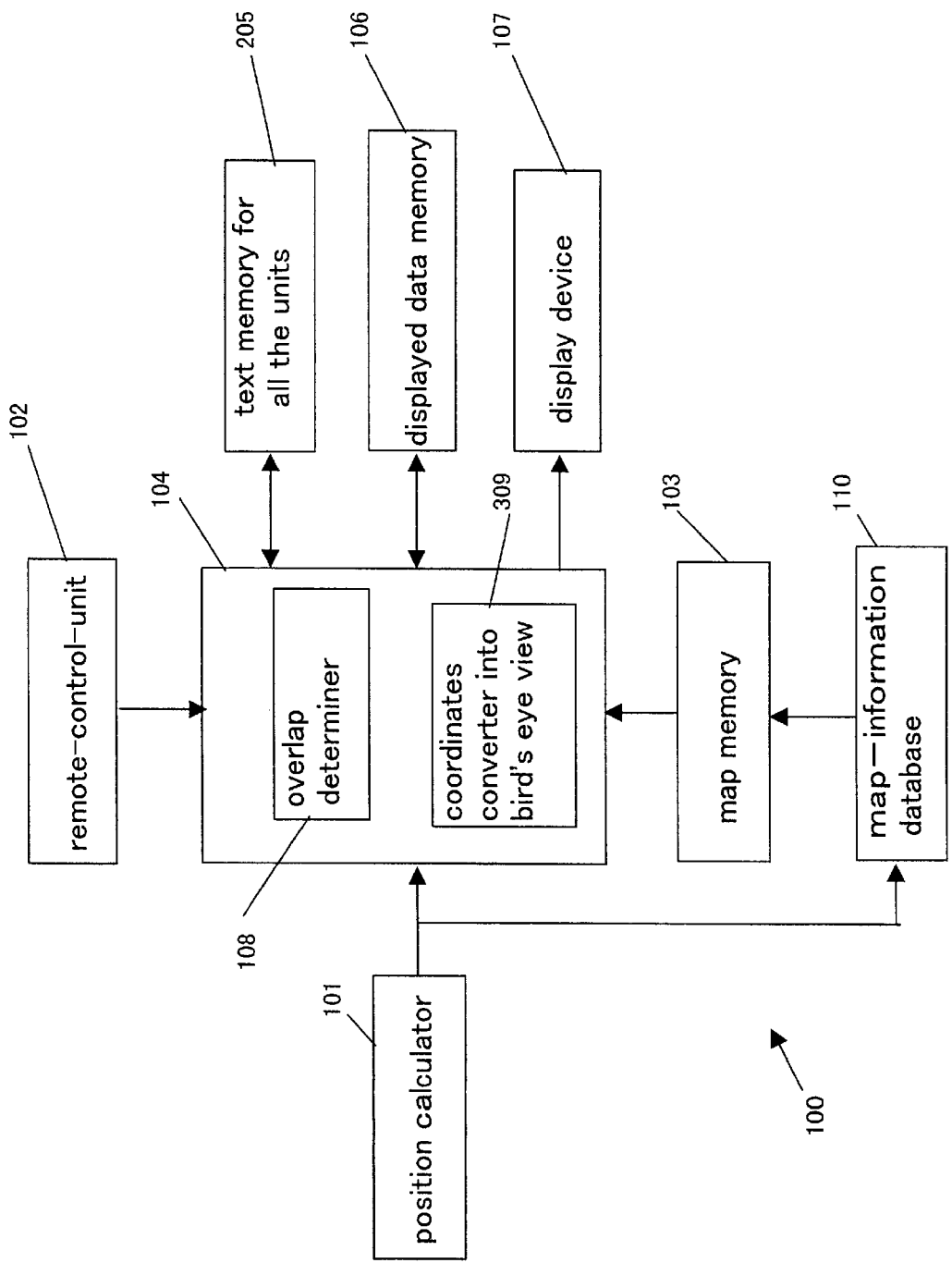
FIG. 11 is a flowchart depicting an operation of the car navigation system used in the fourth embodiment.

FIG. 11 illustrates a structure of a car navigation system in accordance with a fourth exemplary embodiment. In FIG.

11, the same elements as shown in FIG. 10 are denoted with the same reference marks, and the descriptions thereof are thus omitted here. The structure shown in FIG. 11 differs from that in FIG. 10 in the text-memory, which stores one unit of texts in the structure shown in FIG. 10; however, text-memory 205 shown in FIG. 11 stores all the units of texts necessary for re-writing the screen. The operation and advantage due to this difference is described in the second embodiment, thus the description thereof is omitted here. Other operations and advantages are the same as those described in the third embodiment.

Fifth Exemplary Embodiment

Figure 12:
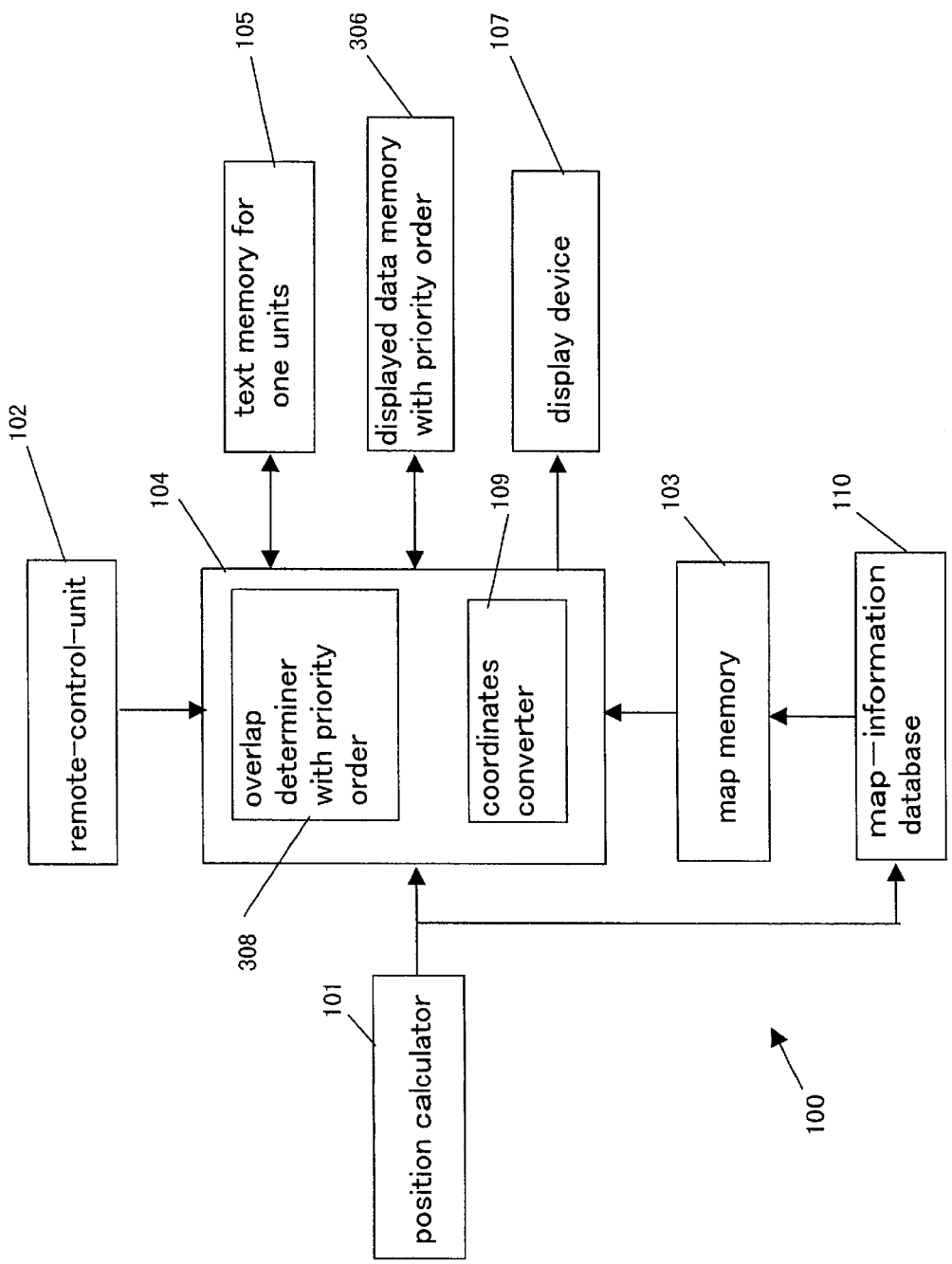
FIG. 12 is a flowchart depicting an operation of the car navigation system used in the fifth embodiment.

FIG. 12 illustrates a structure of a car navigation system in accordance with a fifth exemplary embodiment. In FIG. 12, the same elements as shown in FIG. 2 are denoted with the same reference marks, and the descriptions thereof are thus omitted here. The structure shown in FIG. 12 differs from that in FIG. 2 in the following two points: (1) displayed-data memory 306 stores the data together with a priority order of displaying, and (2) overlap determiner 308 determines an overlap including the priority order of displaying.

There is a priority-order in texts, e.g. if a point-of-interest name disappears from the screen, a driver has more difficulty identifying his position. Thus the point-of-interest name should preferably have a high priority, while a name of building should have a low priority.

This fifth embodiment considers the priority order, and displayed-data memory 306 stores texts together with their priority order of displaying. Overlap determiner 308 determines an overlap including the priority order of displaying. In other words, if a text of lower priority is stored in displayed-data memory 306 because this text was once displayed, this text is not displayed when it is overlapped with a text of higher priority. Then only this higher priority text is displayed. This structure allows the car navigation system of the present invention to always display a text of higher priority of displaying when texts overlap each other.

Sixth Exemplary Embodiment

Figure 13:
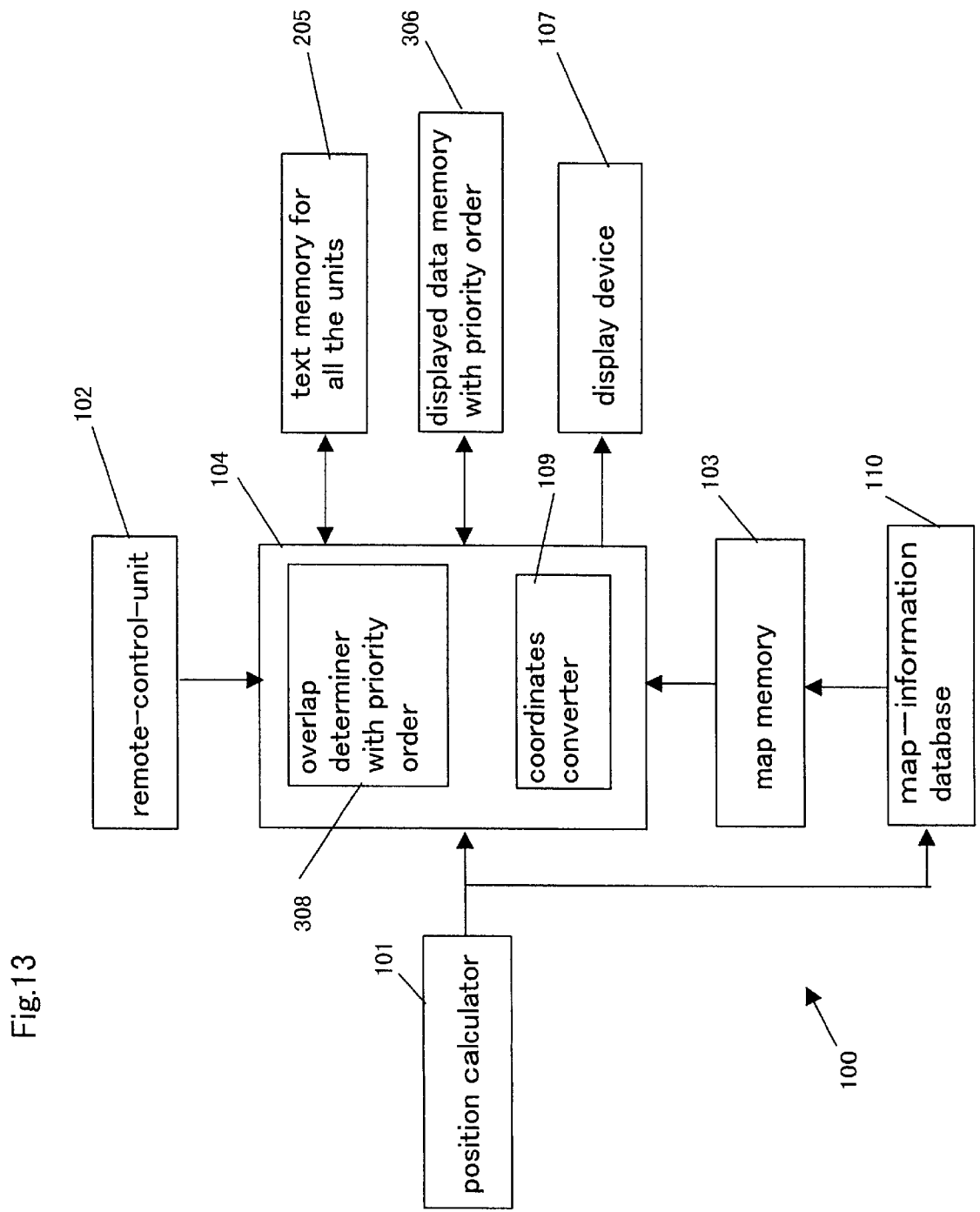
FIG. 13 is a flowchart depicting an operation of the car navigation system used in the sixth embodiment.

FIG. 13 illustrates a structure of a car navigation system in accordance with a sixth exemplary embodiment. In FIG. 13, the same elements as shown in FIG. 12 are denoted with the same reference marks and the descriptions thereof are thus omitted here. The structure shown in FIG. 13 differs from that in FIG. 12 in the text-memory, which stores one unit of texts in the structure shown in FIG. 12; however, text-memory 205 shown in FIG. 13 stores all the units of texts necessary for re-writing the screen. The operation and advantage due to this difference is described in the second embodiment, thus the description thereof is omitted here. Other operations and advantages are the same as those described in the fifth embodiment.

Seventh Exemplary Embodiment

Figure 14:
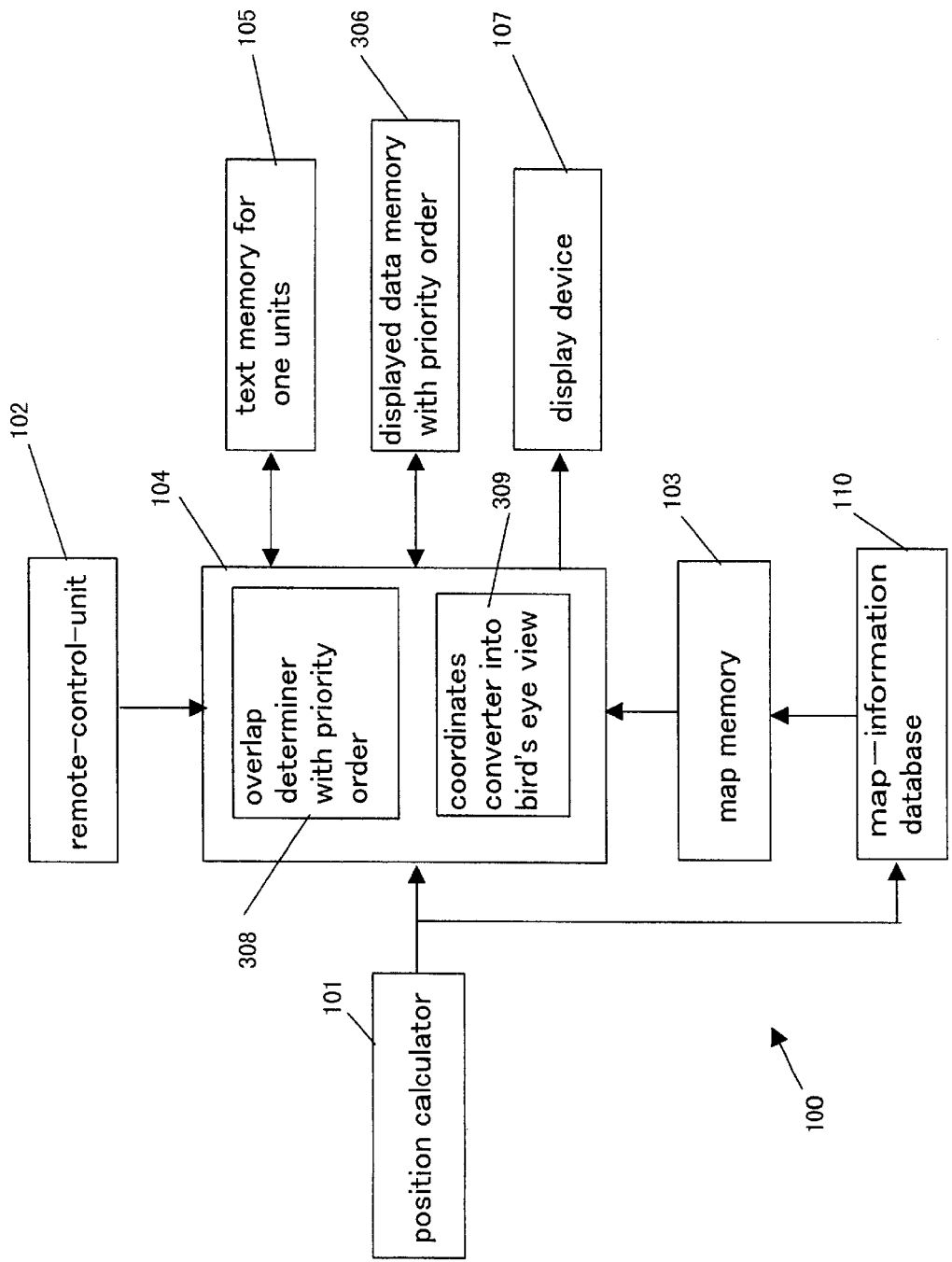
FIG. 14 is a flowchart depicting an operation of the car navigation system used in the seventh embodiment.

FIG. 14 illustrates a structure of a car navigation system in accordance with a seventh exemplary embodiment. In FIG. 14, the same elements as shown in FIG. 10 are denoted with the same reference marks, and the descriptions thereof are thus omitted here. The structure shown in FIG. 14 differs from that in FIG. 10 in the following two points: (1) displayed-data memory 306 stores the data together with priority order of displaying, and (2) overlap determiner 308 determines an overlap including the priority order of displaying.

The operation and advantage due to these differences are described in the fifth embodiment, thus the description thereof is omitted here. Other operations and advantages are the same as those described in the third embodiment.

Eighth Exemplary Embodiment

Figure 15:
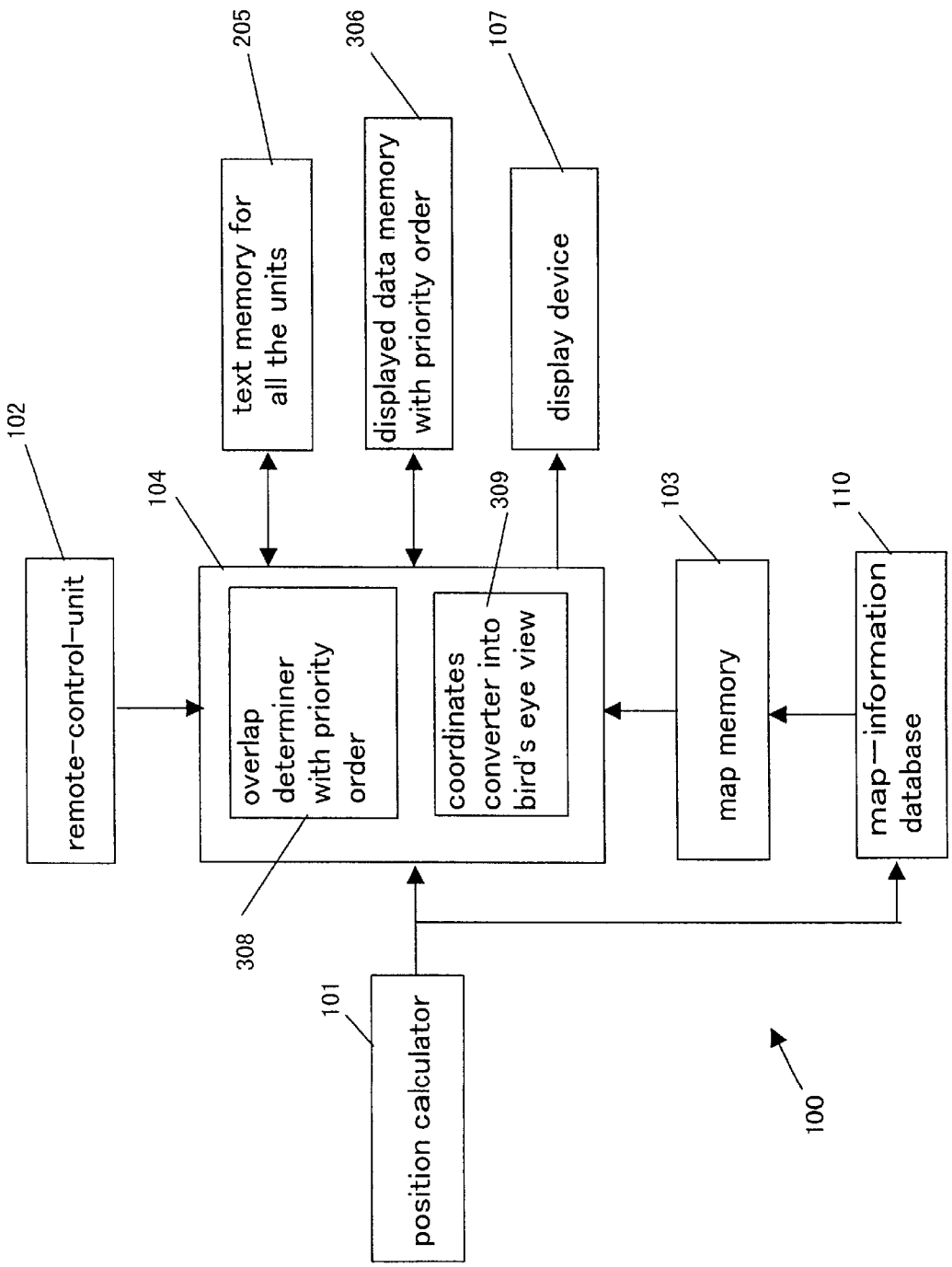
FIG. 15 is a flowchart depicting an operation of the car navigation system used in the eighth embodiment.

FIG. 15 illustrates a structure of a car navigation system in accordance with an eighth exemplary embodiment. In FIG. 15, the same elements as shown in FIG. 11 are denoted with the same reference marks, and the descriptions thereof are thus omitted here. The structure shown in FIG. 15 differs from that in FIG. 11 in the following two points: (1) displayed-data memory 306 stores the data together with priority order of displaying, and (2) overlap determiner 308 determines an overlap including the priority order of displaying.

The operation and advantage due to these differences are described in the fifth embodiment, thus the description thereof is omitted here. Other operations and advantages are the same as those described in the fourth embodiment.

Ninth Exemplary Embodiment

Figure 16:
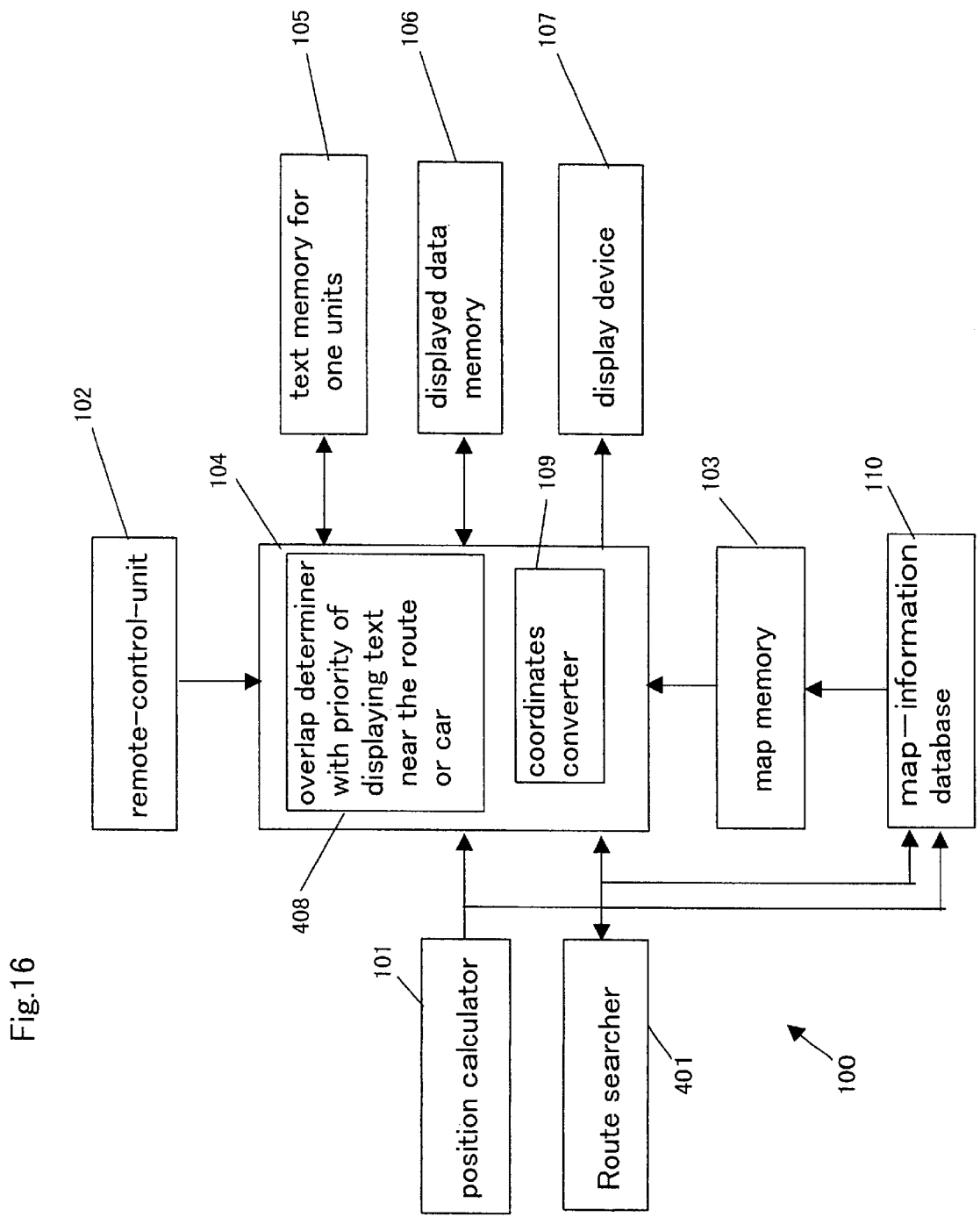
FIG. 16 is a flowchart depicting an operation of the car navigation system used in the ninth embodiment.

FIG. 16 illustrates a structure of a car navigation system in accordance with a ninth exemplary embodiment. In FIG. 16, the same elements as shown in FIG. 2 are denoted with the same reference marks, and the descriptions thereof are thus omitted here. The structure shown in FIG. 16 differs from that in FIG. 2 in the following two points: (1) the structure shown in FIG. 16 has route-searcher 401 for figuring out a route to be taken by the car, and (2) overlap determiner 408—for determining whether or not texts are overlapped—advantageously displays the text near the route or the car over other texts.

An important point for a map displayed in a car-navigation-system is not to just display a map per se but to clarify for the car's driver where the car is now, and which direction the car should be headed. Therefore, texts near the car and its route to be taken are advantageously displayed with respect to other texts.

Route-searcher 401 searches a route from the present position figured out by position calculator 101 to a destination, and reads out a map corresponding to the route searched, then stores the map into map-memory 103 (via map-information database 110). At the same time, the text included in the map is stored in text-memory 105. Overlap determiner 408 determines whether or not the text stored in memory 105 overlaps with texts stored in displayed-text-memory 106. Determiner 408 determines so that the text near the car or route can be advantageously displayed over other texts. This structure displays important information for a driver, such as the text near the car position and the route to be taken, on display device 107 without disappearing or blinking.

In this embodiment, co-ordinates converter 109 for rotative conversion is described; however, converter 309 for bird's-eye-view conversion can be used instead.

Also in this embodiment, text-memory 105 for storing texts in one unit is described; however, text-memory 205 for storing all units of texts necessary for re-writing a screen can be used instead.

In this embodiment, displayed-data-memory 106 is described; however, memory 306 for storing displayed-data together with its priority order for displaying can be used instead.

In the embodiments previously discussed, a case of displaying the text in a lower section of a screen advantageously over other texts is discussed; however, the text in one direction on the screen, e.g. the text along the heading direction of the car can be advantageously displayed instead.

What is claimed is:

1. A car navigation system comprising:
   a position calculator determining the present position of a car;
   a reader for reading a position on a map corresponding to the present position of the car;
   a text memory for storing text corresponding to positions on the map;
   a displayed-data-memory for storing text which has been displayed; and
   an overlap determiner for determining whether or not the text stored in said text memory overlaps with the text stored in said displayed-data-memory.

2. The car navigation system as defined in claim 1, wherein a text determined by said overlap determiner as being free from overlapping is displayed.

3. The car navigation system as defined in claim 1, wherein said text-memory stores the text unit by unit.

4. The car navigation system as defined in claim 1, wherein said text-memory stores the text in all units to be displayed.

5. The car navigation system as defined in claim 1, wherein said overlap determiner displays the text displayed in one direction of a displaying screen advantageously with respect to other text.

6. The car navigation system as defined in claim 1, wherein said overlap determiner displays the text on a lower section of a displaying screen advantageously with respect to other text.

7. The car navigation system as defined in claim 1, wherein said overlap determiner displays a text near a car advantageously with respect to other text.

8. The car navigation system as defined in claim 1, wherein said overlap determiner displays the text near a route to be taken by a car advantageously with respect to other text.

9. The car navigation system as defined in claim 1, wherein said overlap determiner assumes a frame having a given size with respect to the text, and surrounding said text and determines an overlap using the frame.

10. The car navigation system as defined in claim 1, wherein said overlap determiner assumes a frame having a given size with respect to the text and surrounding said text, and varies the frame-size depending on whether said frame is located in an upper section or a lower section of a displaying screen, and determines an overlap using the frame.

11. The car navigation system as defined in claim 1, wherein said overlap determiner displays the text stored in displayed-data-memory (106) advantageously with respect to other text.

12. The car navigation system as defined in claim 1 further comprising a co-ordinates-converter for converting co-ordinates of the stored map, wherein said overlap determiner determines whether or not a text undergone a co-ordinates-conversion is overlapped.

13. The car navigation system as defined in claim 12, wherein said co-ordinates-converter performs a bird's-eye-view conversion on the text.

14. The car navigation system as defined in claim 12, wherein said co-ordinates-converter converts the text rotatively.

15. The car navigation system as defined in claim 1, wherein said displayed-data-memory has a displaying priority information for said stored text, and said overlap determiner determines an overlap responsive to the priority.

16. The car navigation system as defined in claim 1, further comprising a route searcher for searching a route from the present position figured out to a destination;
   wherein said overlap determiner determines an overlap for displaying a text near the present position of a car and the route advantageously with respect to other text.

* * * * *